Figure 3:
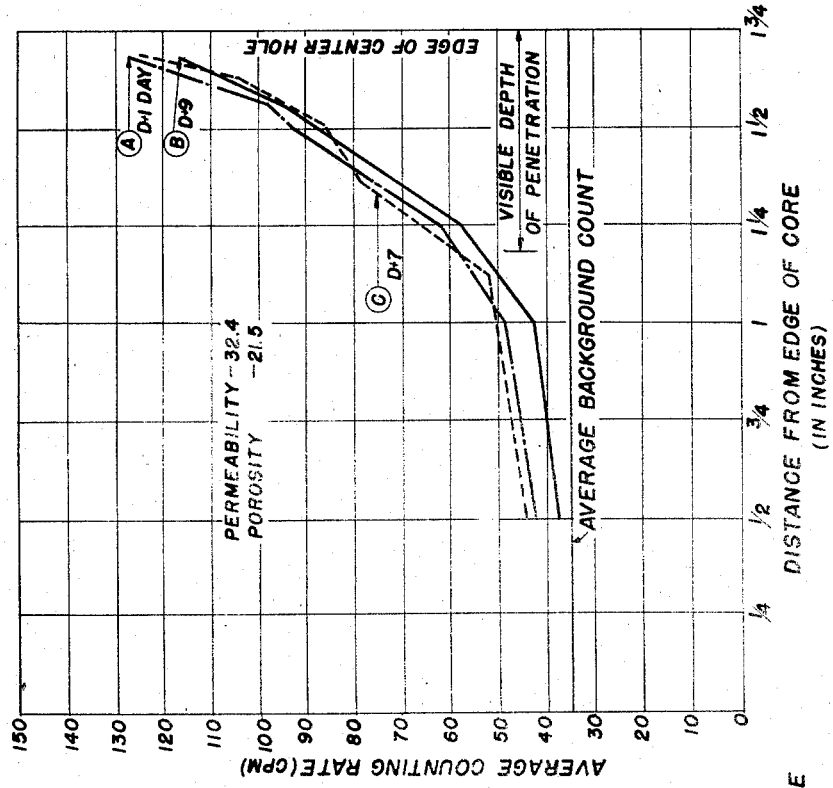

Oct. 27, 1959 A. T. SAYRE, JR 2,910,587
WELL LOGGING PROCESS
Filed Dec. 27, 1956 2 Sheets-Sheet 1

INVENTOR.
ALLYN T. SAYRE JR.
BY Edward H Lang
ATTORNEY

Oct. 27, 1959     A. T. SAYRE, JR     2,910,587
WELL LOGGING PROCESS

Filed Dec. 27, 1956     2 Sheets-Sheet 2

INVENTOR.
ALLYN T. SAYRE JR.
BY
*Edward W. Lung*
ATTORNEY

United States Patent Office 2,910,587
Patented Oct. 27, 1959

---

2,910,587

WELL LOGGING PROCESS

Allyn T. Sayre, Jr., Fort Morgan, Colo., assignor to The Pure Oil Company, Chicago, Ill., a corporation of Ohio Application December 27, 1956, Serial No. 630,968

8 Claims. (Cl. 250—43.5)

This invention relates to a subsurface geologic survey technique. It is more directly concerned with formation logging by analyzing representative geological sections obtained by coring subsurface strata traversed by a borehole.

As a tool in the development, evaluation, and exploitation of fluid hydrocarbon-bearing subterranean reservoirs, core analyses have proven valuable in determining and evaluating the production characteristics of a formation by means of porosity, permeability and fluid saturation determinations made by conducting appropriate tests on formation samples. Other tests which can be conducted by means of core analysis include acidizing, interstitial water content, core-water salinity and others. Because of the need for utilizing a drilling mud for obtaining core samples by means of conventional core drilling techniques, certain limitations are imposed upon core analysis because of the flushing of the core by the drilling mud filtrate. As a result of the flushing, the constitution and condition of the core as analyzed will be changed from the original reservoir conditions. When water-base muds are employed, the filtrate loss is water, oil is generally flushed from the core, and the oil and water saturation values as determined from core analysis are not representative of conditions existing in the reservoir. Similarly, when oil-base mud is employed in the coring operation the filtrate loss is oil and the oil and water-saturation values can also be affected. Because of this invasion of the core by the mud filtrate during the coring operation, it is essential to know the degree to which the results of the core analysis differ from actual formation conditions. Unless the extent of this contamination is known reliable determinations of the original fluid saturations in the core are impossible. It is, therefore, an object of this invention to provide a well-coring technique which permits the rapid determination of the depth of mud filtrate invasion of the core sample. Another object of this invention is to provide a non-destructive test for determining the effect of the flushing action of the drilling mud filtrate employed in obtaining the core on the natural fluid content of recovered core samples. It is an additional object of this invention to provide a radioactive chemical-tracer method for determining the degree to which the mud filtrate resulting from the use of a drilling mud in the well-coring operation has contaminated the core. It is also an object of this invention to employ a radioactive chemical-tracer which can be quantitatively determined if complete flushing of the core by the mud filtrate occurs. These and other objects will become more apparent from the following detailed description of this invention.

Figure 1:
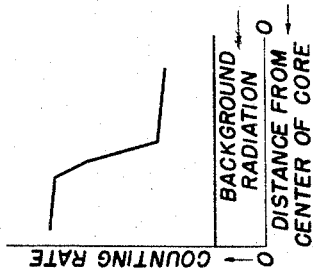

Figure 1 illustrates a typical radioactivity profile of a core recovered by employing an embodiment of the core sampling technique of this invention.

Figure 2:
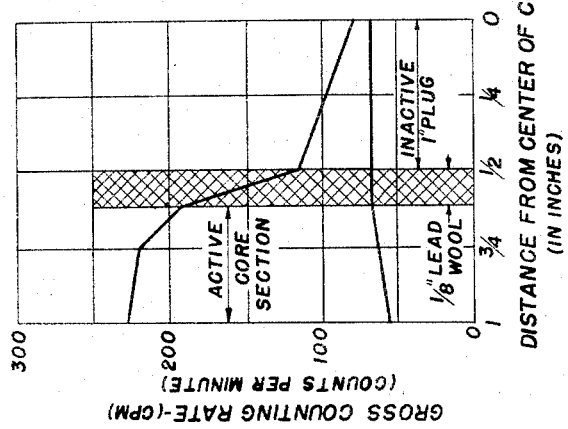
Figure 4:
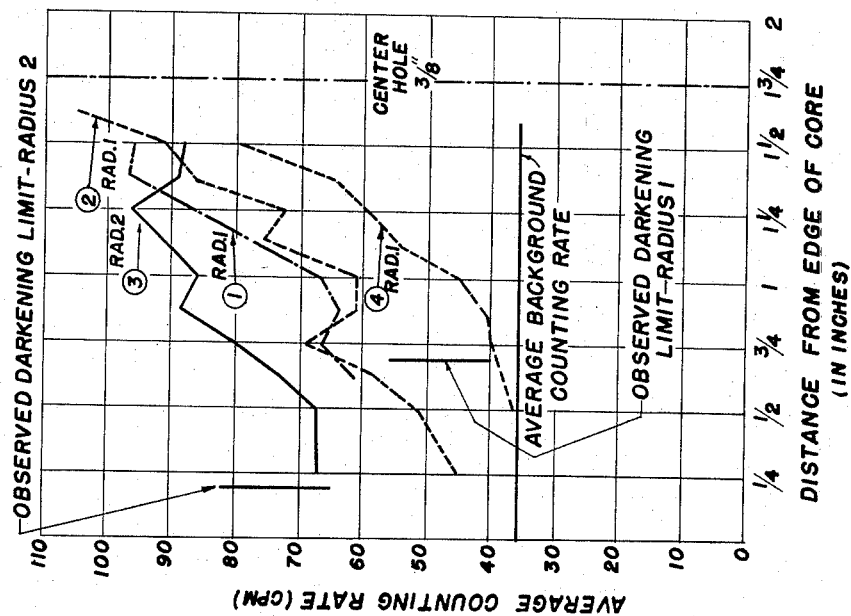
Figure 4:
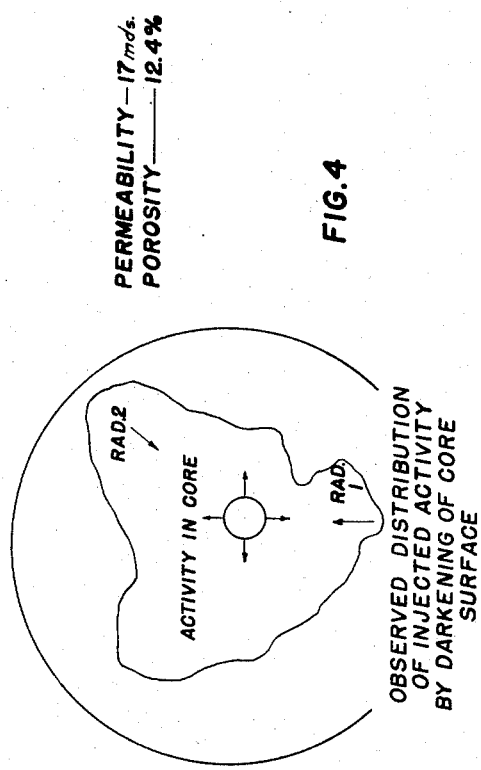

Figures 2, 3, and 4 show radioactivity profiles of oil well cores penetrated to various depths by radioactive solutions.

In actual practice, core samples uncontaminated by the drilling mud filtrate are very difficult to obtain with consistency. Because varying degrees of flushing by the drilling mud filtrate occur during the coring operation, the extent of flushing must be determined in order to properly evaluate the fluid saturations in the core as obtained from core analysis.

To differentiate between the total fluid content of the core resulting from the invasion of drilling mud filtrate and naturally occurring fluids, various techniques have been developed using chemical reagents to trace the intrusion of the drilling mud filtrate. Because it is generally preferred that water-base muds be used instead of an oil-base mud in coring techniques, a water filtrate is usually incorporated in the core sample. These chemical techniques have required quantitative analytical methods for determining the extent of contamination of the core sample by drilling mud filtrate. To carry out this chemical analysis, it is necessary to destroy the core sample, thereby preventing further use of the core for other analyses. Although such a time-consuming analysis may permit an evaluation of the fluid contents, it does not indicate the portions of the core which have been invaded by the drilling mud filtrate. According to this invention it has been found that the degree of invasion of the core sample by drilling mud filtrate can be expeditiously carried out in a non-destructive manner by utilizing radioactive chemical-tracer techniques. In carrying out the core-sampling technique of this invention, a small amount of a radioactive material is added to the drilling mud employed in conventional coring operations. Thereafter, the cores which are obtained are subjected to the scrutiny of radiation detectors for determining the extent to which the drilling mud filtrate has invaded the core sample surface.

Radioactive materials emit radiations of three primary types:

(1) Alpha particles: These are identical to helium nuclei and are usually emitted from radio-isotopes of the heavier elements. They possess very little penetrating power but produce intense ionization along their paths.

(2) Beta particles: These are negative electrons and are emitted from a variety of radioisotopes. They exhibit greater penetration and lower ionization intensity than alpha particles.

(3) Gamma rays: These are electromagnetic rays similar to X-rays, but usually of higher energy. They exhibit much greater penetration and lower ionization intensity than beta particles.

Detection and measurement of these radiations are usually accomplished by sensitive electronic equipment comprising a Geiger tube, scintillation counter, or other suitable detector, and a scaler or ratemeter to indicate the detector output. In tests made for tracing mud filtrates in drill cores, a thin-window Geiger tube and a scaler have been used to measure beta radiation from a beta-gamma emitter used as a tracer.

The choice of a beta-, beta-gamma-, or gamma-emitting isotope for a tracer is largely dependent upon the nature of the measurements to be made and the available instrumentation. A system of measurement is preferred which requires the least concentration of radioactivity and utilizes readily obtained or modified equipment. Final selection of a specific isotope is governed by half-life, possible biological hazards, physical and chemical stability, and availability of usable chemical forms.

Alpha emitters as a whole are considered extremely hazardous, are available in very limited quantities, and present practical problems in measurement because of their very limited penetration. Accordingly, alpha emitters would not be preferred as tracers in the process of this invention.

In the last decade, experience in AEC, industrial, and university laboratories has shown that radioisotopes can be handled very safely. A few simple precautions are adequate for protection of the worker from harmful radiation exposure in radiotracer work. Simple monitoring procedures and devices such as pocket dosimeters and film badges are employed to assure that radiation exposures are within the limits recommended by the National Committee on Radiation Protection, which is sponsored by The National Bureau of Standards.

Many radioisotopes are available for use as tracers. A partial list includes:

Beta-emitters: yttrium-90, phosphorous-32, bismuth-210, calcium-45, sulfur-35, carbon-14, etc.

Beta-gamma-emitters: cadmium-115, gold-198 and -199, molybdenum-99, antimony-122, iodine-131, barium-140, iron-59, zirconium-95, cobalt-60, bromine-82, silver-111, etc.

Gamma-emitters: chromium-51, tin-113, barium-131, mercury-197, etc.

All of these isotopes are available through the facilities of the AEC, usually in the form of chlorides or nitrates in solution. A tracer in any other chemical form desired can usually be prepared from these materials.

For tracing aqueous drilling fluids, the chemical forms in which the isotopes are received from the supplier are usually preferred since no further chemical preparation is required. However, their physical and chemical stability in the system to be investigated should be checked before use. Although not ordinarily used as a drilling fluid in coring operations, oil-base or oil-emulsion drilling muds can be employed, if desired, for specific applications. Oil-soluble tracers incorporating the radioisotope to be used are prepared by organic synthesis, nuclear recoil reactions, or other suitable processes. Examples of such materials are benzene (C–14), iodobenzene (I–131), tricresyl phosphate (P–32), carbon disulfide (C–14 or S–35), iron (Fe–59) or cobalt (Co–60) naphthenates, etc.

In measuring the radioactivity of the core sample, conventional radiation equipment comprising Geiger-Mueller counters, scintillation counters, or the like, can be used. Because of their beta-counting efficiency, thin-window Geiger-Mueller counters are preferred for use as radiation detectors. Other counting methods can be utilized for determining the specific activity of the core sample being analyzed. Various methods for measuring radioactivity and detecting and measuring equipment are comprehensively considered in such standard texts as:

Taylor: Measurement of Radioisotopes, Wiley (1951).
Korpf: Electron and Nuclear Counters, Van Nostrand (1946), and Sharpe: Nuclear Radiation Detectors, Wiley (1955).

In obtaining the core samples employed in this invention, conventional rotary drilling equipment employing rotary core-barrel assemblies are utilized. Because the specific manipulative techniques employed in obtaining the core cuttings are not within the scope of this invention, reference is made to "Subsurface Geologic Methods," Le Roy, Colorado School of Mines at page 609 et seq., "Petroleum Production Engineering," Uren, 3rd edition, McGraw-Hill, for coring techniques.

In conducting the coring operation, water-base drilling fluids are preferably employed. The water-base fluids generally comprise a suspension or gel of bentonite in water weighted by 325 mesh barium sulfate. The instability of these fluids to salt and calcium can be overcome by the addition of such materials as starch, tannin, gums or polyphosphates. Oil-base type drilling fluids, if used, generally are formulated from fuel oils which have been gelled by the addition of blown asphalts, lime or various other types of soaps. Calcium carbonate or weakly hydrophilic oxides, such as magnitite or litharge, can be employed as weighting materials. Drilling fluids of the emulsion type are essentially water-base muds to which an emulsifying agent and oil have been added. Proper selection and composition of the drilling fluid employed will depend upon the characteristics desired. For a more comprehensive discussion of drilling fluids reference is made to "Composition and Properties of Oil Well Drilling Fluids," Rogers, Gulf. The amount of radioactive tracer which is incorporated in the drilling fluid will depend upon the level determined by (a) radioactive decay before measurement, (b) efficiency of measurement, (c) formation porosity, if known. In general, an amount sufficient to yield a radioactivity of about 1 to 10 mc. per barrel of drilling fluid can be safely employed. In using amounts of radioactive materials which will give activities in excess of this, extreme care must be taken to avoid exposure of operating personnel to excess dosages.

In carrying out the process of this invention, a desired amount of radioactive tracer is incorporated in the drilling mud to be employed in the coring operation by simple admixing during the formulation of the fluid, or in the course of the coring operation. By means of conventional coring techniques, core samples are collected. Although the core samples can be evaluated in the field, it is preferred that they be returned to the laboratory for analysis. Shipment can be made by wrapping the samples in aluminum, lead foil or other protective wrapping which will effectively prevent any radiation from escaping from the package, and placing the wrapped cores in a container which is then sealed. The smaller the core diameter the greater the chance for contamination throughout the core. Therefore, it is desirable to cut a core that has a diameter that would not permit complete penetration. The minimum diameter for reliable results would be 3"–4½". Cores larger than 4½" can be obtained, but are not usually cut. Cores below 3" in diameter can be used, but the results are not as reliable. In preparing the cores for evaluation, the cores obtained are transversely fractured with respect to the longitudinal axis of the core to provide a clean face. The flat, transverse face is obtained in one manner by laying the core on a solid surface and placing a stone-mason's chisel perpendicularly to the axis of the core. By hitting the chisel with a hammer the core will usually break perpendicular to the axis or along the bedding plane. A fresh break about 1" to 2" in from either end of the core is then used for scanning with a suitable radiation detector. By conducting scanning measurements along various diameters, a radioactivity profile of the core, such as that shown in Figure 1, can be obtained. The use of this method thereby permits a rapid determination of the extent to which contaminant has penetrated, and permits removal of the unaffected portion of the core for laboratory oil- and water-saturation determinations. In the event that the core is completely contaminated, the amount of contaminating water in the core can be quantitatively determined by the measurement of the radioactivity of the core.

In essence, this complementary, analytical procedure involves taking a section of the completely contaminated core, and comminuting it to produce small granular pieces. The pieces are leached with distilled water and the radioactive tracer recovered in the leachate. When a radioactive iodide is employed as the tracer material it is precipitated from the leachate using a solution of silver nitrate in accordance with conventional quantitative analytical techniques. The precipitate is collected on a filter paper and its radioactivity determined. By comparing the counting rate with a calibration curve which shows the amount of radioactivity in the core, the amount of contamination by the drilling mud filtrate can be determined. After the total water saturation has been determined by conventional techniques, the connate water saturation may be calculated by subtracting the amount of contaminating water from the total water value. If the core is indicated to be completely contaminated it is, therefore, known that the saturations determined by conventional core analysis techniques are not representative of reservoir fluid saturation. Caution should then be used before completing the well. If the center sections shown no activity then the core analysis results are more representative of saturation in the reservoir. These data can then be used with more reliability when completing or evaluating the oil reservoir.

The subject invention is illustrated by the following specific examples. Initial laboratory tests were made to evaluate the performance of the counting apparatus and determine the detectability of the radioactive tracer in the core. Radioactive iodine, I-131, in the form of sodium iodide, was employed as a tracer because of its suitable chemical properties, satisfactory availability, reasonable cost, and safety aspects. Iodine-131 has a half-life of about 8 days and gives off beta and gamma rays. Calculations were made to determine the minimum concentration of activity required for measurement in cores saturated with radioactive solution.

The primary instrumentation used was a thin-window Geiger counter connected to a conventional scaler which provided a regulated D.C. high voltage and totalized pulses from the counter tube. The Geiger tube was shielded with 1″ of lead to reduce background radiation. An ⅛″ Lucite disc with a curved slit aperture (¼″ wide x 1⅛″ chord length, radius of curvature 1½″) covered the tube window and defined the area of measurement. A number of natural Berea sandstone radial cores, 3 inches in diameter, were prepared with drilled centerholes ranging in diameter from ⅜ inch to 1 inch. The cores were evacuated and saturated with aqueous solutions containing 15 and 150 microcuries of iodine-131 per gallon and 0.01 gram of ordinary sodium iodide per gallon as a carrier. Unsaturated sandstone plugs were placed in the center holes and lead wool was packed around the plugs so that no void space existed between the plug and the core. The core was placed in a holder and the core surface immediately scanned with a Geiger counter. The core was stored in a desiccator and scanned periodically thereafter for several days. A number of cores were studied in this manner. A representative graphical presentation of the results of this work is shown in Figure 2 where it is seen that a definite line of demarcation can be detected employing a conventional radiation detector.

Cores obtained from producing formations would ordinarily not be completely saturated with the radioactive mud filtrate but would also contain connate water and oil. The presence of other fluids in the core along with the contaminating fluid could affect the counting rate on the core surface. Three radial cores, 3¾ inches in diameter, from various producing horizons were used in another series of tests. In these tests the cores were saturated with oil and water to simulate the fluid distribution in the cores in the reservoir prior to coring. These cores had a ¼-inch hole drilled vertically through the center of the core. The cores were extracted and porosity and permeability measurements made, after which the cores were saturated with a 5 percent brine solution. Using the "restored state" method the cores were then reduced to equilibrium water saturation by injection of Soltrol, a proprietary petroleum naphtha marketed by Phillips Petroleum Co. An aqueous solution containing 150 microcuries of iodine-131 per gallon was then injected into each core to simulate fluid saturation after coring. The core was split in half (parallel to the bedding plane) and visual observation for the depth of penetration of the radioactive solution was made. Counting measurements for radioactivity were made on a fresh core surface at different distances from the edge of the core. The cores were stored in a desiccator and scanned with the Geiger counter periodically thereafter for two weeks.

The activity in one of the three test cores, core #1 which is shown graphically in Figure 3, was calculated (from amount of solution injected) to have penetrated from the center to 1³⁄₁₆ inches from the edge of the core. A scan of the core surface showed the interface of activity to be between 1 and 1¼ inches from the outer edge of the core, in satisfactory agreement with the calculated value. The core surface was scanned every day for seven days after which time the interface of activity was still in the same position. The counting rate on the core surface did not change at any position over the seven days of measurement, as would be expected from iodine radioactivity decay. Continued evaporation at the core surface apparently concentrated activity at the surface continuously and sufficiently to maintain the original counting rate.

The observed (visual) depth of penetration of the radioactivity in core No. 2 is given in Figure 4. The core surface was first scanned along radius 1 and the counting rate indicated the radioactive front to be between ½ and ¾ inch from the edge of the core. The observed depth of activity was at ¾ inch in from the edge of the core and in fair agreement with the value obtained from scanning. The core surface along radius 1 was scanned 6 days later and the position of the activity front was found to be unchanged. The lower overall counting rate on the sixth day was caused by decay of activity. Results obtained by scanning the core along radius 2 showed that the activity front was very close, within ¼ inch, to the core edge. Visual observation of the core surface verified the location of activity.

Following the counting measurements, chips from the active center section and the indicated non-active sections were evaluated, qualitatively, by the precipitation method for the presence of activity. These tests showed that all the sections indicated by scanning to be active did have radioactive material present. No section indicated by scanning to be nonactive had any detectable radioactive material present in the precipitate.

From these results it is seen that (1) an interface of activity in oil-saturated cores can be located to within ¼ of an inch in scanning the core surface with a Geiger counter, and (2) the radioactive interface as indicated by surface activity content remains essentially stationary for several days; it does not diffuse through the core. Although it might be suggested from the visual profile that a visual observation technique could be used, dyes or fluorescent materials, however, would not be operative since these materials are usually highly surface-active and the clay material in the core would adsorb the materials. Accordingly the dye would not be carried to the depth of penetration of the filtrate due to adsorption.

By means of the instant invention, mud filtrate invasion of geological core samples can be accurately, easily, and economically measured to provide reliable information about depth of penetration of the contaminant. Radioactive chemical-tracer materials with a half-life sufficiently long to permit radioactivity measurements to be conveniently made, but short enough to facilitate disposal and decontamination, are readily available. The concentration of radioactive material added to the drilling mud is sufficiently low to avoid any serious hazard in connection with the operating personnel. The non-destructive nature of the subject technique provides an advantage not available in other prior art, core-analysis techniques. It is evident that departures from the specific illustrative examples of this invention can be made without going beyond the scope of this invention. Such modifications are apparent to those skilled in this art. Accordingly, this invention is defined in the following claims as:

1. A process for measuring the invasion and depth of penetration of mud filtrate in geological core samples obtained by coring subterranean geological strata employing a drilling fluid, which comprises incorporating a fluid-soluble, radioactive tracer material in the drilling fluid in an amount sufficient to impart radioactivity to said fluid used in said coring, collecting a tubular core sample during said coring, transversely fracturing said sample with respect to the longitudinal axis of said core to provide a substantially mud-free, flat surface, and determining the radioactivity profile of said surface by scanning said surface with a suitable radioactivity counter.

2. A process for measuring the invasion and depth of penetration of mud filtrate in geological core samples obtained by coring subterranean geological strata employing an aqueous drilling fluid, which comprises incorporating a water-soluble, radioactive tracer material in the drilling fluid used in said coring, collecting a tubular core sample during said coring, transversely fracturing said sample with respect to the longitudinal axis of said core to provide a clean, substantially flat surface, and determining the radioactivity profile of said surface by scanning said surface with a suitable radioactivity counter.

3. A process for measuring the invasion and depth of penetration of mud filtrate in geological core samples obtained by coring subterranean geological strata employing an aqueous drilling fluid, which comprises incorporating a water-soluble radioactivity tracer material in the drilling fluid in an amount sufficient to yield a radioactivity of about 1–10 millicuries per barrel of drilling fluid, collecting a tubular core sample during said coring, transversely fracturing said sample with respect to the longitudinal axis of said core to provide a clean, substantially flat surface, and determining the radioactivity profile of said surface by scanning said surface with a suitable radioactivity counter.

4. A process in accordance with claim 3 in which radioactive iodine is employed as the tracer material.

5. A process for measuring the invasion and depth of penetration of mud filtrate in geological core samples obtained by coring subterranean geological strata employing an aqueous drilling fluid, which comprises incorporating a water-soluble, radioactive tracer material in the drilling fluid used in said coring, collecting a tubular core sample during said coring, transversely fracturing said sample with respect to the longitudinal axis of said core to provide a clean, substantially flat surface, and determining the radioactivity profile of said surface by radially scanning said surface with a suitable radioactivity counter.

6. A process for measuring the invasion and depth of penetration of mud filtrate in geological core samples obtained by coring subterranean geological strata employing an aqueous drilling fluid, which comprises incorporating a water-soluble radioactivity tracer material in the drilling fluid in an amount sufficient to yield a radioactivity of about 1–10 millicuries per barrel of drilling fluid, collecting a tubular core sample during said coring, transversely fracturing said sample with respect to the longitudinal axis of said core to provide a clean, substantially flat surface, and determining the radioactivity of said surface by radially scanning said surface with a suitable radioactivity counter.

7. A process in accordance with claim 6 in which radioactive iodine is employed as the tracer material.

8. A process for measuring the invasion and depth of penetration of mud filtrate in geological core samples obtained by coring subterranean geological strata employing an aqueous drilling fluid, which comprises incorporating a water-soluble radioactive tracer material consisting essentially of I–131 in the drilling fluid in an amount sufficient to yield 1–10 millicuries per barrel of drilling fluid used in said coring, collecting a tubular sample during said coring, transversely fracturing said sample with respect to the longitudinal axis of said core by laying a knife edge transverse to longitudinal axis of the core intermediate the extremities thereof and striking a sharp blow against said knife edge thereby fracturing said core and providing a substantially mud-free flat surface, and determining the radioactivity of said surface by radially scanning it with a suitable radioactivity counter.

References Cited in the file of this patent

UNITED STATES PATENTS

| | | |
|---|---|---|
| 2,110,310 | Shayes et al. | Mar. 8, 1938 |
| 2,544,412 | Bird | Mar. 6, 1951 |
| 2,840,717 | De Witte | June 24, 1958 |